United States Patent
Agarwal et al.

(10) Patent No.: US 12,437,385 B2
(45) Date of Patent: Oct. 7, 2025

(54) REAL-TIME FORMATIONS CUTTINGS ANALYSIS SYSTEM USING COMPUTER VISION AND MACHINE LEARNING APPROACH DURING A DRILLING OPERATION

(71) Applicant: Halliburton Energy Services, Inc., Houston, TX (US)

(72) Inventors: Sakshi Agarwal, Uttar Pradesh (IN); Fahad Ghayas Ahmad, Cypress, TX (US); Shaun Patrick Lawrence, Spring, TX (US); Howard James Neil Black, Aberdeen (GB); Anita Kirsten Torr, Tomball, TX (US); Varun Tyagi, Houston, TX (US)

(73) Assignee: Halliburton Energy Service, Inc., Houston, TX (US)

(*) Notice: Subject to any disclaimer, the term of this patent is extended or adjusted under 35 U.S.C. 154(b) by 422 days.

(21) Appl. No.: 17/974,300

(22) Filed: Oct. 26, 2022

(65) Prior Publication Data
US 2024/0144458 A1 May 2, 2024

(51) Int. Cl.
*G06K 9/00* (2022.01)
*E21B 21/08* (2006.01)
(Continued)

(52) U.S. Cl.
CPC ............ *G06T 7/0004* (2013.01); *E21B 21/08* (2013.01); *E21B 47/022* (2013.01); *E21B 47/04* (2013.01);
(Continued)

(58) Field of Classification Search
CPC . G06T 7/0004; G06T 7/11; G06T 7/50; G06T 7/62; G06T 2207/10016;
(Continued)

(56) References Cited

U.S. PATENT DOCUMENTS 6,960,756 B1  11/2005  Penumadu et al.
9,372,162 B2 *  6/2016  Ganz .................... G01N 23/046
(Continued)

FOREIGN PATENT DOCUMENTS

CN      114037693 A  *  2/2022  ............. G06N 3/045
WO  WO2028026995 A1 *  8/2008
WO      2022032057       2/2022

OTHER PUBLICATIONS

Well Control Space Out: A Deep-Learning Approach for the Optimization of Drilling Safety Operations, Arturo Magana-Mora et al., IEEE Access, Jun. 2021, pp. 76479-76492 (Year: 2021).*

(Continued)

*Primary Examiner* — Jayesh A Patel
(74) *Attorney, Agent, or Firm* — DeLizio, Peacock, Lewin & Guerra LLP

(57) ABSTRACT

In some embodiments, a method for controlling a learning machine used in a drilling operation to drill a well into a subsurface formation includes receiving, via a video stream, an image of debris including cuttings from the drilling operation. The method may further include generating a first mask on the image to identify the cuttings in the debris, generating, via instance segmentation, a second mask for each of the identified cuttings, determining, based on the second masks, one or more properties of each of the cuttings, and associating each of the identified cuttings to a depth interval of the subsurface formation based, at least in part, on the properties of each of the identified cuttings and at least one property of the drilling operation.

20 Claims, 8 Drawing Sheets

(51) Int. Cl.
| | |
|---|---|
| *E21B 47/022* | (2012.01) |
| *E21B 47/04* | (2012.01) |
| *E21B 49/00* | (2006.01) |
| *G01V 8/02* | (2006.01) |
| *G06T 7/00* | (2017.01) |
| *G06T 7/11* | (2017.01) |
| *G06T 7/50* | (2017.01) |
| *G06T 7/62* | (2017.01) |

(52) U.S. Cl.
CPC .............. *E21B 49/005* (2013.01); *G01V 8/02* (2013.01); *G06T 7/11* (2017.01); *G06T 7/50* (2017.01); *G06T 7/62* (2017.01); *E21B 2200/22* (2020.05); *G06T 2207/10016* (2013.01); *G06T 2207/20081* (2013.01); *G06T 2207/30164* (2013.01)

(58) Field of Classification Search
CPC ........... G06T 2207/20081; G06T 2207/30164; G01V 8/02; G06V 10/44; G06V 10/82; G06V 2201/06
See application file for complete search history.

(56) References Cited

U.S. PATENT DOCUMENTS

| | | | |
|---|---|---|---|
| 9,651,468 | B2 | 5/2017 | Rowe et al. |
| 10,927,671 | B1 | 2/2021 | Tonner et al. |
| 11,530,998 | B2 * | 12/2022 | Sungkorn ............ G01V 11/002 |
| 11,719,089 | B2 * | 8/2023 | Affleck ................ E21B 21/066 702/6 |
| 11,946,366 | B2 * | 4/2024 | Ismailova ............ E21B 49/005 |
| 12,131,526 | B2 * | 10/2024 | Yamada .................. E21B 44/00 |
| 12,154,324 | B1 * | 11/2024 | Marlot ................... G06V 10/26 |
| 2014/0333754 | A1 | 11/2014 | Graves et al. |
| 2016/0130928 | A1 | 5/2016 | Torrione |
| 2016/0370274 | A1 | 12/2016 | Rowe et al. |
| 2017/0058620 | A1 | 3/2017 | Torrione |
| 2017/0089153 | A1 | 3/2017 | Teodorescu |
| 2017/0161885 | A1 | 6/2017 | Parmeshwar et al. |
| 2021/0180417 | A1 | 6/2021 | Shekhar et al. |
| 2021/0181362 | A1 * | 6/2021 | Jiang ..................... G01V 20/00 |
| 2021/0189813 | A1 | 6/2021 | Torrione |
| 2021/0254457 | A1 | 8/2021 | Anifowose et al. |
| 2021/0319257 | A1 * | 10/2021 | Francois ............. G01N 15/088 |
| 2022/0251951 | A1 * | 8/2022 | Ismailova ............ E21B 49/005 |
| 2022/0277635 | A1 | 9/2022 | Michalopulos et al. |
| 2022/0381132 | A1 * | 12/2022 | Badis .................... E21B 47/002 |
| 2023/0167738 | A1 * | 6/2023 | Ismailova ............. G01N 33/24 73/152.11 |
| 2023/0351580 | A1 * | 11/2023 | Di Santo ................ G06V 10/44 |
| 2023/0374903 | A1 * | 11/2023 | Al-Qubaisi ........... E21B 49/005 |

OTHER PUBLICATIONS

Image processing and machine learning based cavings characterization and classification, Jian Jin et al., ELSEVIER, 2021, pp. 1-23 (Year: 2021).*

Automated lithology classification from drill core images using convolutional neural networks, Fatimah Alzubaidi et al., ELSEVIER, 2021, pp. 1-13 (Year: 2021).*

Automated Computer Vision System for Real-Time Drilling Cuttings Monitoring, Runqi Han, B.S. University of Texas, 2016, pp. vi-100 (Year: 2016).*

Identification and Instance Segmentation of Oil Spills Using Deep Neural Networks, Zahra Ghorbani et al., ICEPTP, 2020, pp. 140-1 to 140-8 (Year: 2020).*

Automated drill cuttings size estimation, Leyla Ismailova et al., ELSEVIER, Nov. 2021, pp. 1-10 (Year: 2021).*

"PCT Application No. PCT/US2023/071009, International Search Report and Written Opinion", Nov. 9, 2023, 10 pages.

* cited by examiner

REAL-TIME FORMATIONS CUTTINGS ANALYSIS SYSTEM USING COMPUTER VISION AND MACHINE LEARNING APPROACH DURING A DRILLING OPERATION

TECHNICAL FIELD

The disclosure generally relates to drilling operations involving drilling a borehole into one or more subsurface formations, and in particular, learning machines used to optimize the drilling operation.

BACKGROUND

During drilling operations, cuttings and cavings (both may generally be referred to as "cuttings") may be monitored while drilling a borehole. The cuttings may reveal insights as to a cleaning efficiency of the borehole and or potential causes of wellbore instability downhole. The cuttings and cavings may comprise solid material removed from the borehole during drilling and may be circulated to separation equipment, such as one or more shale shakers, at a drill site at the surface. The cuttings may be separated from a drilling fluid, such as drilling mud, at the shale shaker by a screen which passes fluids, smaller granulates, and other debris while retaining cuttings of sizes suitable for analysis. The cuttings may be collected and analyzed to diagnose wellbore instability conditions. Traditional practice may utilize a mud logger—a person on site who manually collects and continuously examines cuttings samples—to perform analyses including, but not limited to, visually inspecting the cuttings, checking drilling mud rheology, and moving back and forth between a mud logging unit and the shale shaker. This type of monitoring may only be considered as real-time when the mud logger is at the shale shakers, which is often infrequent. Therefore, automating the process of cuttings and cavings monitoring may optimize drilling operations as well as reduce safety incidents involving on-site personnel.

BRIEF DESCRIPTION OF THE DRAWINGS

Embodiments of the disclosure may be better understood by referencing the accompanying drawings.

DESCRIPTION OF EMBODIMENTS

Overview

The cuttings analysis system described herein may be configured for detecting cuttings and cavings on a shale shaker, analyzing the cuttings, determining various cuttings parameters, analyzing a volume trend of the cuttings, and associating the cuttings, which may be indicative of a problem associated with the drilling operation downhole, to the formation of which they were sourced. The system may include a camera to stream video of cuttings passing through the shale shaker. Frames may be extracted from this video stream to generate two-dimensional, top-view images of the shale shaker comprising the cuttings. The system may utilize a learning machine to perform image segmentation on the frames, and the learning machine may be trained with a set of labelled images of cuttings. The cuttings analysis system may perform inferencing operations on unseen input images, identify cuttings in real-time, and calculate properties of the cuttings. The cuttings analysis system may use these calculated properties to estimate a volume of individual cuttings and a total volume of cuttings within each input image. The system may use the determined volumes to generate a trend line chart which may be output to a user interface (UI) for view by the mud logger or any expert at the drill site to diagnose any potential problems during drilling. The cuttings analysis system may operate at the drill site or a remote monitoring location. The system may be used to improve formation insight, reduce costs of onsite personnel, improve personnel safety, reduce non-productive time, improve quality of services delivered to clients, reduce operational risk, optimize drilling performance, and improve future well planning. The repeatability of automatic detection may optimize drilling operations over comparatively imprecise manual analyses via a mud logger.

Example System Architecture

Some embodiments may utilize a system architecture to enable parallel processing of image frames from a live source video feed. Parallel processing may allow for faster processing of frames by the cuttings analysis system and reduce backlogging incidents that may be more prevalent in linear or sequential processing. The system architecture may comprise an orchestrator or similar components to modulate the processing of video frames, order processed video frames, and export the processed, ordered frames to a user interface.

Figure 1:
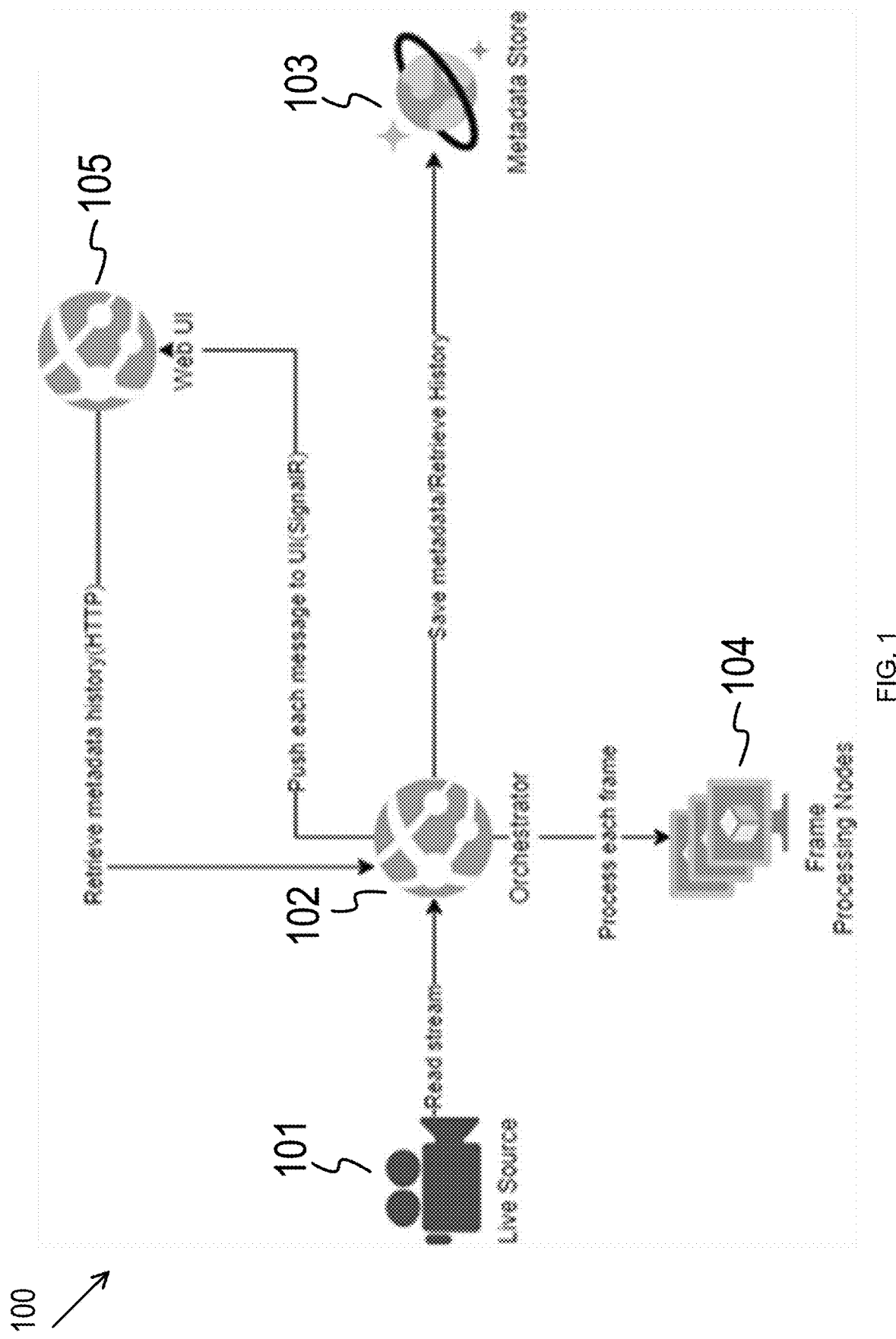
FIG. 1 depicts an example system architecture of a cuttings analysis system comprising an orchestrator, according to some embodiments.

FIG. 1 depicts an example architecture of a cuttings analysis system comprising an orchestrator, according to some embodiments. An orchestrator 102 may receive a stream of live source video ("video feed") 101 of formation cuttings and cavings passing over a shale shaker in a drilling operation. The cuttings may include pieces of the formation shaved by the drill bit, and the cavings may comprise larger, splintered pieces of a formation that were not removed by direct action of the drill bit. Often, cavings may be indicative of an unstable formation or a formation in which the rock has partially failed.

The video feed 101 may originate from a camera mounted with a line of sight to the shale shaker. The video feed 101 may comprise a certain frame rate depending on the capability of the camera, the bandwidth of the system, the method by which the video feed 101 is streamed to the cloud, etc. The frame rate of the video feed 101 may dictate a processing requirement of the software. For example, if the video feed 101 has a frame rate of 60 frames per second, the system architecture 100 may require processing of 60 frames per second to generate real-time outputs.

The orchestrator 102 may process each frame of the video feed 101 by sending the frames to frame processing nodes 104. The frame processing nodes 104 may allow for parallel processing of the frames. The parallel processing may distribute the processing load across the frame processing nodes 104, and this may scale horizontally depending on the demands of the system. The orchestrator 102 may save metadata and/or retrieve historical data from a metadata store 103. For example, a user may desire to view historical calculations from prior processed frames. The orchestrator 102 may push messages to a Web UI 105 via SignalR and may further request metadata history or related HTTP information from the Web UI 105.

Figure 2:
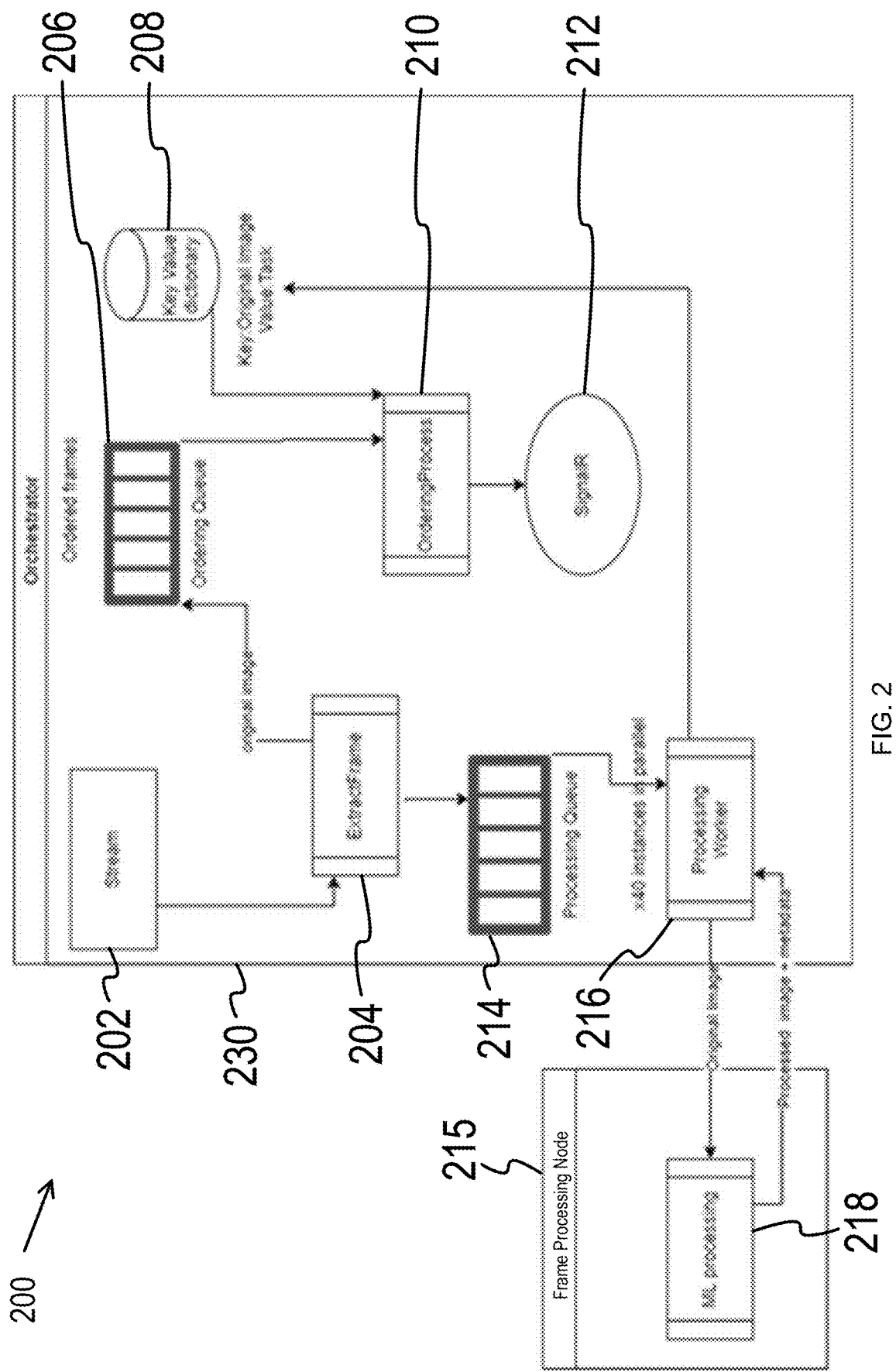
FIG. 2 depicts an architecture of the orchestrator, according to some embodiments.

Each frame processing node of the frame processing nodes 104 may include a machine learning processing unit, also referred to herein as a learning machine. The orchestrator and the learning machine may work together to process image frames and output processed frames in a correct order. FIG. 2 depicts an architecture of the orchestrator, according to some embodiments.

An architecture 200 of FIG. 2 depicts an orchestrator 230 and a frame processing node 215 comprising a learning machine. The orchestrator 230 may include multiple components to ensure frames output from parallel processing and sent to the user interface are in the same order in which they were received, regardless of how long each frame may have taken to process. For example, the orchestrator 230 may intake a video stream 202 comprising live stream video feed. The video stream 202 may be input into an ExtractFrame Module 204 which may extract individual image frames from the video stream 202. The extracted image frame may be placed into a Processing Queue 214. The ExtractFrame Module 204 may also send original image frames to an Ordering Queue 206.

At the Processing Queue 214, each frame extracted from the video stream 202 may be input into a Processing Worker 216 that cooperates with a cloud-based Machine Learning Processing Module 218 ("ML Processing Module 218") within each Frame Processing Node 215. The ML Processing Module 218 may alternatively be referred to as the learning machine. The learning machine 218 may perform image segmentation and other operations on the frames. The learning machine may include one or more neural networks. In some embodiments, before the learning machine is deployed in the field, the learning machine may perform a training process using labeled images.

To enable parallel processing of multiple frames simultaneously, a plurality of the Processing Workers 216 may be utilized in parallel, each Processing Worker 216 processing a single extracted frame at a time. Each Processing Worker 216 may send an unedited image frame extracted from the video stream 202 to a ML Processing Module 218. For each Processing Worker 216, there may be at least one ML Processing Module 218, and all processing worker and ML processing module pairs may work in parallel. Each ML Processing Module 218 may perform segmentation on each extracted input image frame, create a mask on the image to identify cuttings, perform instance segmentation on the cuttings, calculate various parameters of the cuttings, and may approximate a total volume of cuttings within the frame. The ML Processing Module 218 may then output a processed image frame with a cuttings mask and associated metadata back to its corresponding Processing Worker 216. Each processed frame (of a plurality of processed frames output from each of the ML Processing Modules) and its associated metadata may be sent from the Processing Worker 216 (of a plurality of Processing Workers) to a Key Value Dictionary 208. The Key Value Dictionary 208 may comprise key value pairs linking the order of each original image frame and its correlated processed image frame output from its Processing Worker 216. The key value pairs may then be sent to an OrderingProcess Module 210.

The orchestrator architecture 200 may distribute processing across multiple nodes which may complete their frame processing out of order. In parallel processing, some nodes may take longer to process certain frames than others. Thus, it may benefit the system to include components such as the OrderingProcess Module 210 to ensure that the processed frames, when sent to a user, reflect the order in which they arrived. The OrderingProcess Module 210 may order processed image frames in the order in which they appear in the video stream 202 using keys from the Key Value Dictionary 208, regardless of whether certain frame processing nodes complete their processing out of order. After all processed frames have been ordered, the string of processed frames may be sent to a SignalR module 212. From the SignalR module 212, the string of processed frames may be pushed to a web-based user interface where an operator may monitor a processed video stream comprising masked cuttings in real-time.

Example Method for Generating Training Data

Figure 3:
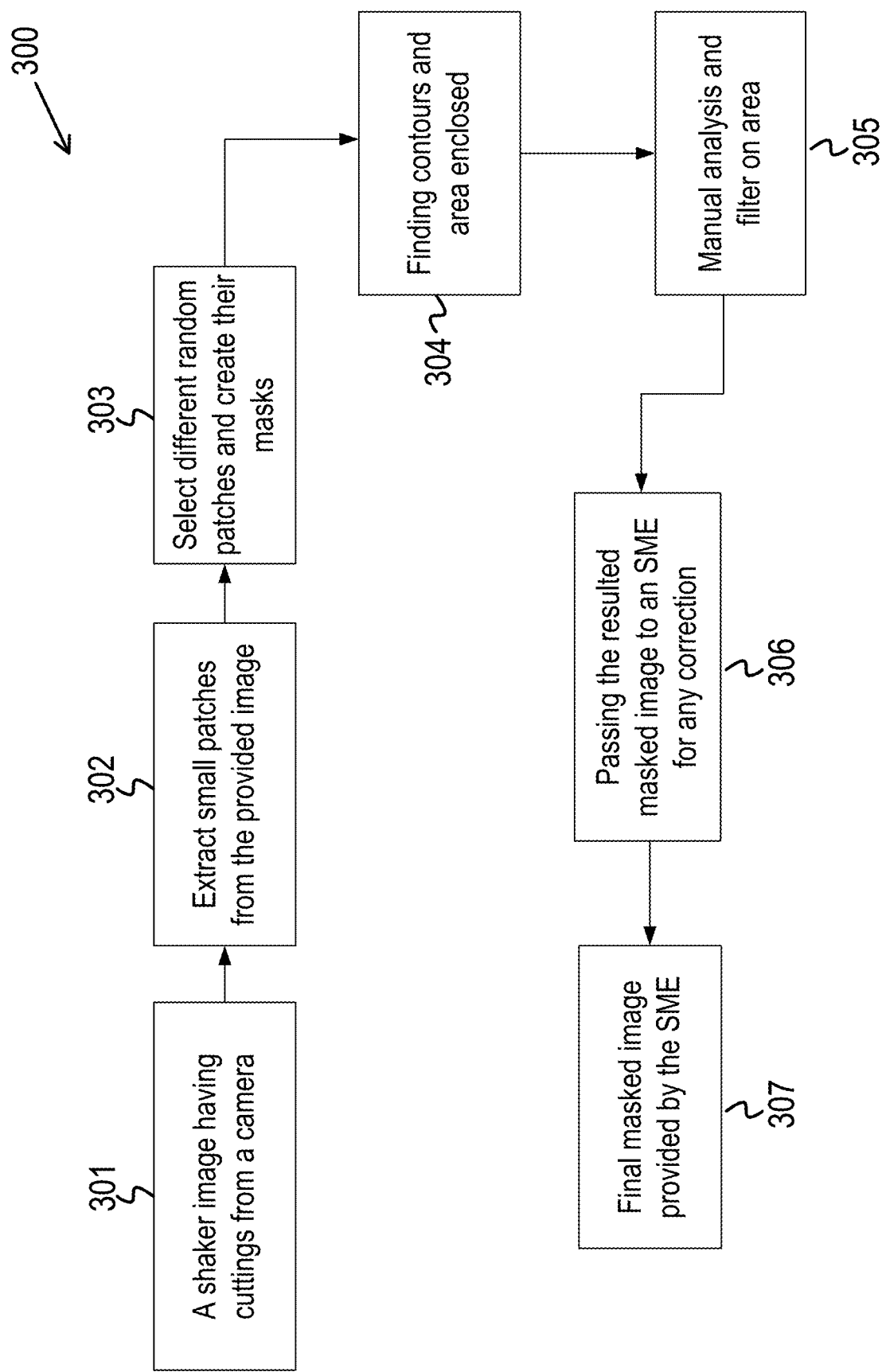
FIG. 3 depicts a process for generating masked images for training a learning machine, according to some embodiments.

As described above, the orchestrator 102 may be utilized in tandem with a learning machine to analyze cuttings within frames extracted from the video feed 101. The learning machine may include a deep learning model/machine that may implement a deep learning approach to cuttings detection and analysis. The learning machine may benefit from training data (generated offline) for better recognition of cuttings properties. FIG. 3 depicts a process for generating masked images for training a learning machine, according to some embodiments. Flow starts at block 301.

At block 301, an image frame having formation cuttings and/or cavings on a shale shaker may be provided for analysis. The image may be of a similar perspective (positioning) and of similar camera quality to a shale shaker-mounted camera during an active drilling operation. Flow progresses to a block 302.

At block 302, small patches may be extracted from the provided image. Rather than utilizing the entire provided image, the provided image may be partitioned into small patches for mask creation and eventual training of the learning machine. The patches may consist of equal size portions of any suitable two-dimensional shape. The patches may be selected by a subject matter expert. The patches may be in any format suitable for input into the learning machine. The patches may allow for faster processing, as the orchestrator and learning machine may process multiple smaller images in less time than if the entire image were input into either system. Flow then progresses to block 303.

At block 303, different random patches may be selected from the small patches on the provided image, and masks may be created for the selected random patches. The masks may apply a color filter to identify cuttings and/or cavings in a foreground, contrasted against the remaining unmasked image in the background of the frame. A classifier may be used to classify the cuttings detected as masks and the background of the image as having no mask. Flow progresses block 304.

At block 304, contours and an area enclosed by the masked cuttings and/or cavings may be calculated. The contours may be identified as edges or borders of the cuttings/cavings, and calculations may be performed to calculate the area enclosed within the contours. Flow then progresses to block 305.

At block 305, manual analysis may be performed on the masks, and the masks may be filtered by their calculated area. The manual analysis and filtering of the masks may improve their quality. For example, manual analysis and filtering may result in masks that better adhere to the actual contours and real area of the cuttings within each image frame. The manual analysis may also comprise calculating an area, Feret diameter, volume, shape, etc. for each of the masked cuttings. These properties may be corrected or used to gauge the accuracy of the learning machine. Flow progresses to block 306.

At block 306, the resultant masked image may be corrected. In some embodiments, the masked image is passed to a subject matter expert (SME) for correction. The SME may remove segments that do not comprise cuttings and add masks to cuttings that were missed. The SME may perform similar quality control measures until the image comprising the masked cuttings/cavings is satisfactory for training. In some embodiments, the masked image may be corrected by automatic means, such as a remote web service (not shown), separate application program (not shown), etc. Flow progresses to block 307.

At block 307, the final masked image may be provided, such as by the SME or by an automated image processor (e.g., separate application program). The final masked image may be utilized to train the learning machine to identify cuttings/cavings from other debris on a shale shaker. Process 300 may be repeated a plurality of times to yield multiple masked images for training. Once a satisfactory number of masked images have been created, the learning machine may be trained using the masked images.

Example Method for Training a Learning Machine

Figure 4:
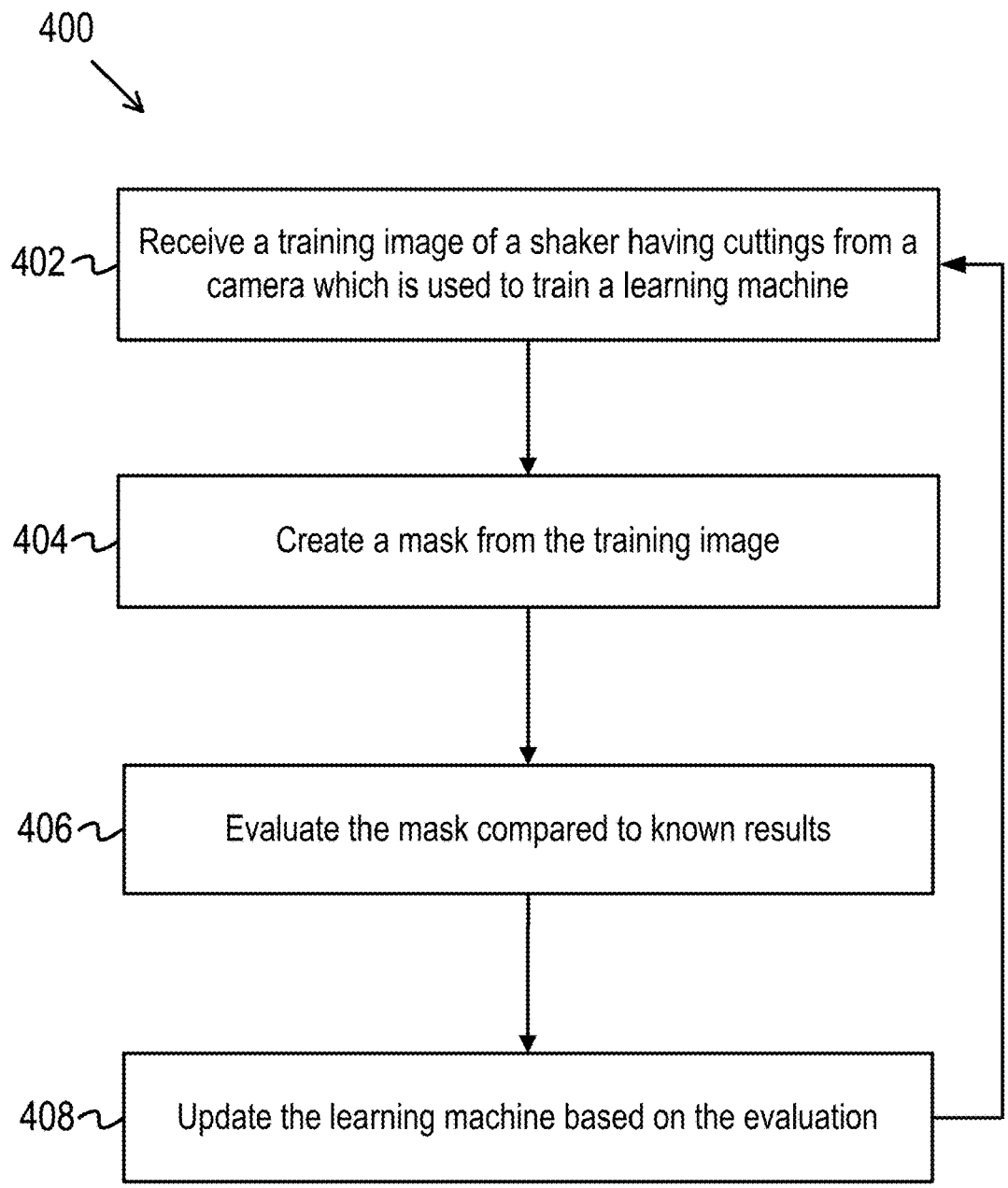
FIG. 4 depicts a process to train the learning machine, according to some embodiments.

FIG. 4 depicts a process to train the learning machine, according to some embodiments. After the SME of FIG. 3 has performed quality assurance on the final masked image, the image may be input into a learning machine, which may consist of a deep learning model, for training. A training process 400 describes operations for training the learning machine in cuttings identification according to the masks provided through the process of FIG. 3. Flow begins at block 402.

At block 402, the learning machine may receive, from a camera, a training image of a shaker having cuttings. The training image may be of similar resolution and perspective to those used to generate the masked images for training. The training image may not yet include a mask. Flow progresses to block 404.

At block 404, the learning machine may create a mask from the training image. The mask may include identified cuttings and/or cavings within the training image. The learning machine may apply Computer Vision techniques such as segmentation to create a mask of all identified cuttings in the training image. The learning machine may further perform instance segmentation to designate separate masks for each identified cutting and/or caving within the training image. The learning machine may calculate parameters such as size, shape, Feret diameter, etc. of each masked cutting after instance segmentation. The learning machine may also calculate a volume of each cutting, estimate a total volume of cuttings within the masked image, and output results to a web-based UI or spreadsheet to be viewed by an operator. Flow progresses to block 406.

At block 406, the mask created by the learning machine may be evaluated and compared to known results. The known results may include the masked images and/or calculations created during the process of FIG. 3 and validated by the SME. The evaluation of the mask may be conducted at various neurons or nodes within the learning machine. An error or variance analysis may be conducted by the learning machine to quantify any discrepancies between generated masks and the known results used for training the learning machine. Flow progresses to block 408.

At block 408, the learning machine may update based on the evaluation. If the masks created by the learning machine differ from the masks in the known results, the learning machine may update its algorithm(s) to account for the discrepancy. For instance, the learning machine may update various weights, biases, formulas, or other parameters to align future results with the known results. The training process 400 may repeat a multitude of times until the learning machine is successfully trained—should the learning machine require additional training, flow leads back to block 402. If the learning machine has been successfully trained, flow of process 400 ceases. A determination of successful training may be made when error calculations between the generated and known masks continually asymptote towards zero. When the learning machine is successfully trained, it may be deployed to live, real-world scenarios.

Example Method for Real-Time Cuttings Analysis

Figure 5:
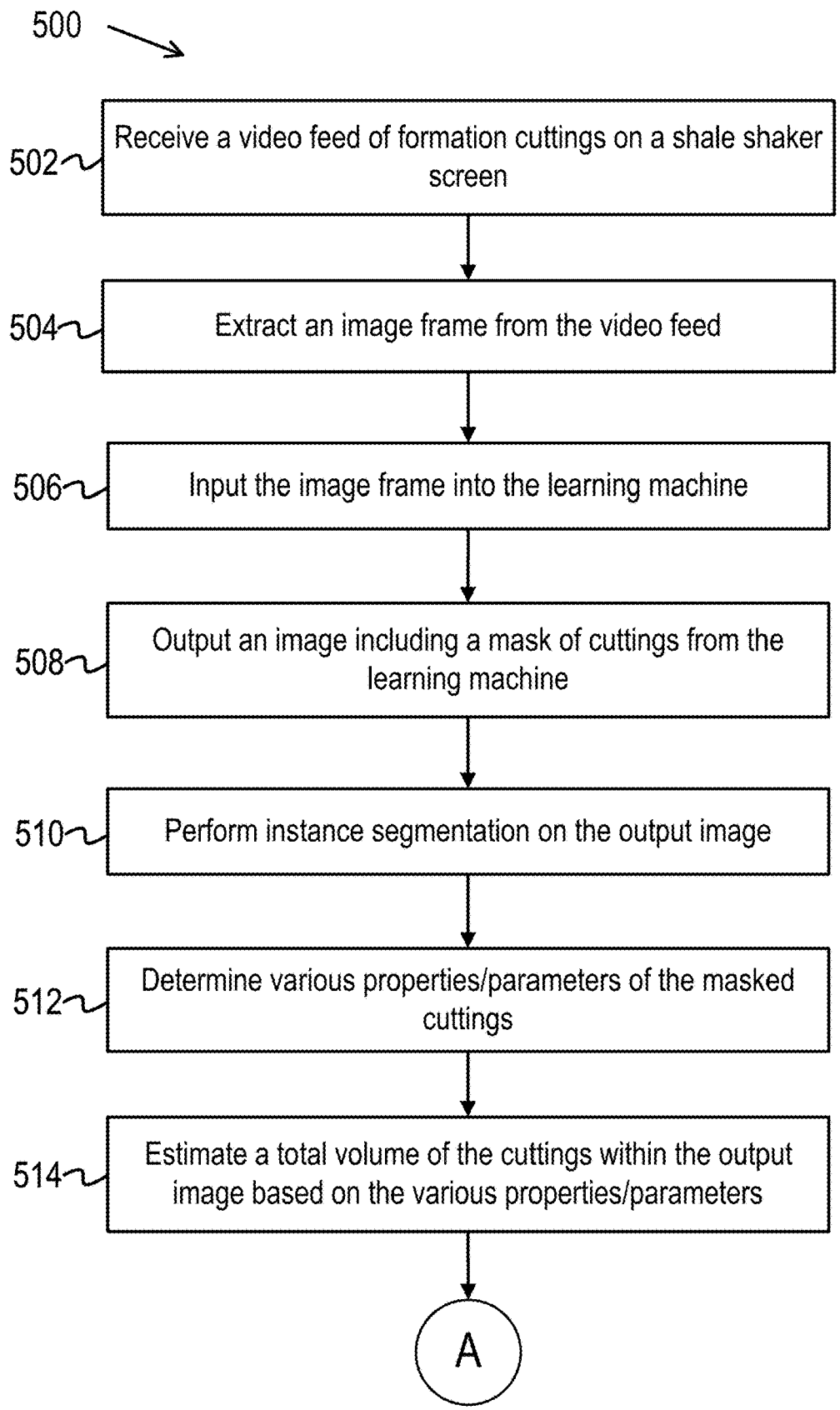
FIG. 5 depicts a flowchart comprising cuttings analysis operations during drilling via the cuttings analysis system, according to some embodiments.

Example deployment of the successfully-trained learning machine for use during a live drilling operation is now described. FIG. 5 depicts a flowchart comprising cuttings analysis operations during drilling via the cuttings analysis system, according to some embodiments. Operations of a flowchart 500 may be performed by software, firmware, hardware, or a combination thereof. Such operations are described with reference to the systems of FIGS. 1-4. However, such operations may be performed by other systems or components. For example, some of the operations may be performed by a computer within or external to the described cuttings analysis system. Operations of the flowchart 500 may refer to analysis of a single image frame, but multiple image frames may be analyzed in parallel. However, in some implementations, one or more image frames may be serially processed. The operations of the flowchart 500 start at block 502.

At block 502, the cuttings analysis system may receive a video feed of formation cuttings on a shale shaker screen. For example, the orchestrator 102 of FIG. 1 may receive the video feed 101. The video feed may originate from a camera mounted in any suitable location, such as above the shale shaker, on the shale shaker, etc. The cuttings analysis system may employ a single camera or a plurality of cameras that produce images of any suitable types, such as non-stereo images. The shale shaker may primarily convey formation cuttings during normal operation but may alternatively convey a large amount of drilling mud with the cuttings during an overflow scenario. Flow progresses to block 504.

At block 504, the cuttings analysis system may extract an image frame from the video feed. The image may be partitioned into smaller, equal-sized patches for additional processing. Flow progresses to block 506.

At block 506, the cuttings analysis system may input the image frame into the learning machine. For example, the orchestrator 230 may send the image frame to a frame processing node 215 comprising an ML processing module 218 (the learning machine). The learning machine 218 may operate with any suitable image of varying resolution, allowing for flexibility in camera or related hardware selection. Flow progresses to block 508.

At block 508, the learning machine may output an image including a mask of cuttings. The learning machine may perform inferencing operations including segmentation via Computer Vision to create a mask for identified cuttings. The learning machine may mark the input image to create the mask. Flow progresses to block 510.

At block 510, the learning machine may perform instance segmentation on the output image. The instance segmentation may assign a separate mask for each individual cutting and/or caving identified in the mask generated in block 508. The learning machine may further include a classifier which may classify cuttings detected in the image as masks and the background as having no mask. Flow progresses to block 512.

At block 512, the learning machine may determine various properties/parameters of the masked cuttings. More specifically, the learning machine may calculate properties of each of the masked cuttings including but not limited to their area, perimeter, Feret diameter, shape, angularity, sphericity, circularity, aspect ratio, lithology, etc. The learning machine may additionally calculate a volume of each cutting from the 2-D image frame. The properties of the masked cuttings may provide information about the drilling operation or the subsurface formation. For example, cuttings or cavings with a larger than expected perimeter, area, and/or approximate volume may indicate a degradation of the wellbore at certain formations. The learning machine may utilize thresholds for various properties of the identified cuttings and flag outliers for view within the UI or dashboard. The learning machine may output the properties of the masked cuttings to one or more tables in one or more spreadsheets, which may also be viewed by an operator in real-time. Flow progresses to block 514.

At block 514, the learning machine may estimate a total volume of the cuttings within the output image based on the various properties/parameters. For example, the learning machine may estimate a sum of the volumes of all cuttings in each image frame based on the determined volumes of each of the individual cuttings. The total volume of cuttings may reveal dysfunction in the drilling operation or additional information on the subsurface formation. For example, a larger than expected total volume of cuttings and/or cavings may indicate an abnormal drilling condition correlating to wellbore instability. This phenomenon, referred to as "washout" may result in an increased size and/or quantity of cuttings at the surface and an erosion of the wellbore downhole. Alternatively, a smaller than expected volume of cuttings may indicate inefficient hole cleaning or lost circulation.

The subsurface formation may be drilled by a drill bit comprising nozzles which may inject drilling mud from a face of the bit. The drilling mud may lubricate and cool the drill bit. The drilling mud may also carry cuttings away from the drill bit, up an annulus of the well, and to the shale shaker at the surface, thus cleaning the borehole. A sustained decrease in the total cuttings volume may signal that cuttings have accumulated around the drill bit, or a thief zone—a highly permeable formation into which circulating fluids may be lost during drilling—may be preventing drilling mud from circulating to the surface. Either scenario may require correction. Inadequate hole cleaning may often lead to costly drilling problems such as pipe sticking, premature bit wear, a slow rate of penetration, formation fracturing, high torque and drag, mud losses, etc. Wellbore instability issues may be a large contributor to non-productive time (NPT) in drilling operations, and the cuttings volume seen at the shale shaker may be an indicator of these problems downhole. Thus, the learning machine may send the total cuttings volume estimate to the orchestrator 230, and the orchestrator 230 may output the results to a dashboard or UI for the mud logger or other operator to view.

While the total cuttings volume as approximated by the learning machine may signify abnormalities in the drilling operation, the learning machine also may be configured to associate the total cuttings volume (and/or any of the other cuttings' properties) to a specific formation or depth interval within the well. The cuttings seen at the shale shaker may not represent in real time what is occurring downhole. A delay or lag time may exist between the drilling of a formation downhole and what is seen at the shale shaker at the surface. This lag time may be affected by multiple drilling parameters including but not limited to a flow rate of drilling mud, fluid properties of a wellbore fluid arriving at the shale shaker with the cuttings, the depth of the drill bit, the size, shape, and weight of the cuttings, an inclination angle or trajectory of the well, etc. However, these factors may be input into the cuttings analysis system to quantify the lag time. Additionally, other suitable data, such as gamma ray logs having live data from a logging while drilling (LWD) operation, may be utilized to quantify the lag time. The lag time may be used to associate cuttings analyzed by the learning machine to the formation in which they were sourced from downhole. The lag time also may be used to determine a depth, spatial location, physical composition, or other information about particular cuttings in an image. Flow progresses to checkpoint A, which is further continued in FIG. 6.

Figure 6:
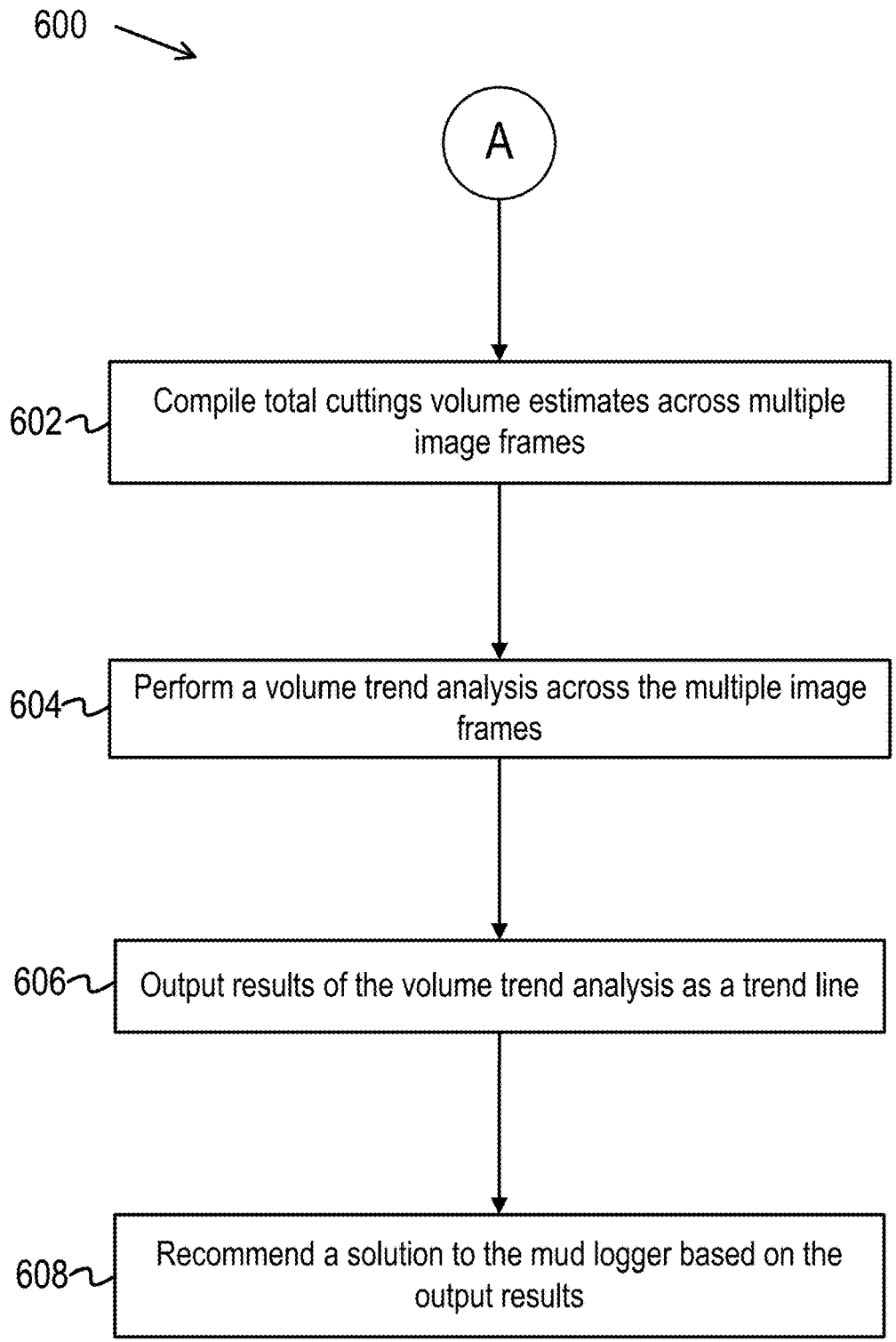
FIG. 6 depicts a volume trend analysis by the cuttings analysis system, according to some embodiments.

FIG. 6 is a continuation of the flowchart from FIG. 5 and depicts a volume trend analysis by the cuttings analysis system, according to some embodiments. Operations of flowchart 600 start at checkpoint A and progress to block 602.

At block 602, the orchestrator may compile total cuttings volume estimates across multiple image frames. The orchestrator 230 may compile total cuttings volume estimates as calculated by each frame processing node 215. The orchestrator 230 may additionally order the processed frames at the OrderingProcess module 210 and output the ordered frames to the UI via the SignalR module 212. Flow progresses to block 604.

At block 604, the cuttings analysis system may perform a volume trend analysis across the multiple image frames. The volume trend analysis may consist of inputting the total cuttings volume estimate of each image frame as data points into a plot in real time. Each total cuttings volume estimate may be correlated to a drilling time downhole, accounting for the lag time of the cuttings. The cuttings analysis system may add additional data points comprising volume data for subsequent frames to the plot. The cuttings analysis system may calculate a moving volume average across a specified number of frames. The moving volume average may be used by the mud logger or operator to diagnose instances wellbore dysfunction. Alternatively, or in addition, the cuttings analysis system may analyze trends of other properties over time such as cuttings area or shape. This may provide further insight to any wellbore dysfunction occurring downhole. Flow progresses to block 606.

At block 606, the cuttings analysis system may output results of the volume trend analysis as a trend line. The cuttings analysis system may plot the moving volume average calculated in block 604 as a linear trend line. The orchestrator may output the trend line to the user interface or a Web UI 105. The trend line may be displayed alongside video feed comprising the cuttings in real time. The trend line may represent the moving volume average of block 604. Alternatively, multiple trend lines may be stitched together across multiple frame intervals each comprising a specified number of frames. The trend line may be used to diagnose issues with the drilling operation, as sustained increases or decreases in the moving volume average of the cuttings may signify various problems occurring downhole. Flow progresses to block 608.

At block 608, the cuttings analysis system may recommend a solution to the mud logger based on the output results. For example, a sustained increase or decrease in total cuttings volume may indicate problems with drilling fluid circulation or damage to the subsurface formation itself. Based on the results output in block 606, the cuttings analysis system may recommend a solution to remedy the suspected issue. For example, if the total cuttings volume spikes across a certain interval, the cuttings analysis system may immediately recommend that the mud logger alert a driller/operator of a potential washout scenario at the depth interval associated with the spike in total cuttings volume. The depth interval may be determined based on the lag time of the cuttings. The cuttings analysis system may also, for example, suggest decreasing a flow rate of mud from the drill bit to alleviate the issue. The cuttings analysis system may then return to normal operation until a subsequent issue arises, if any. If the learning machine within the cuttings analysis system requires improvement, the learning machine may be retrained to enhance its accuracy in cuttings segmentation and detection. Flow of the flowchart 600 may conclude after the operations of block 608.

Example Computer

Figure 7:
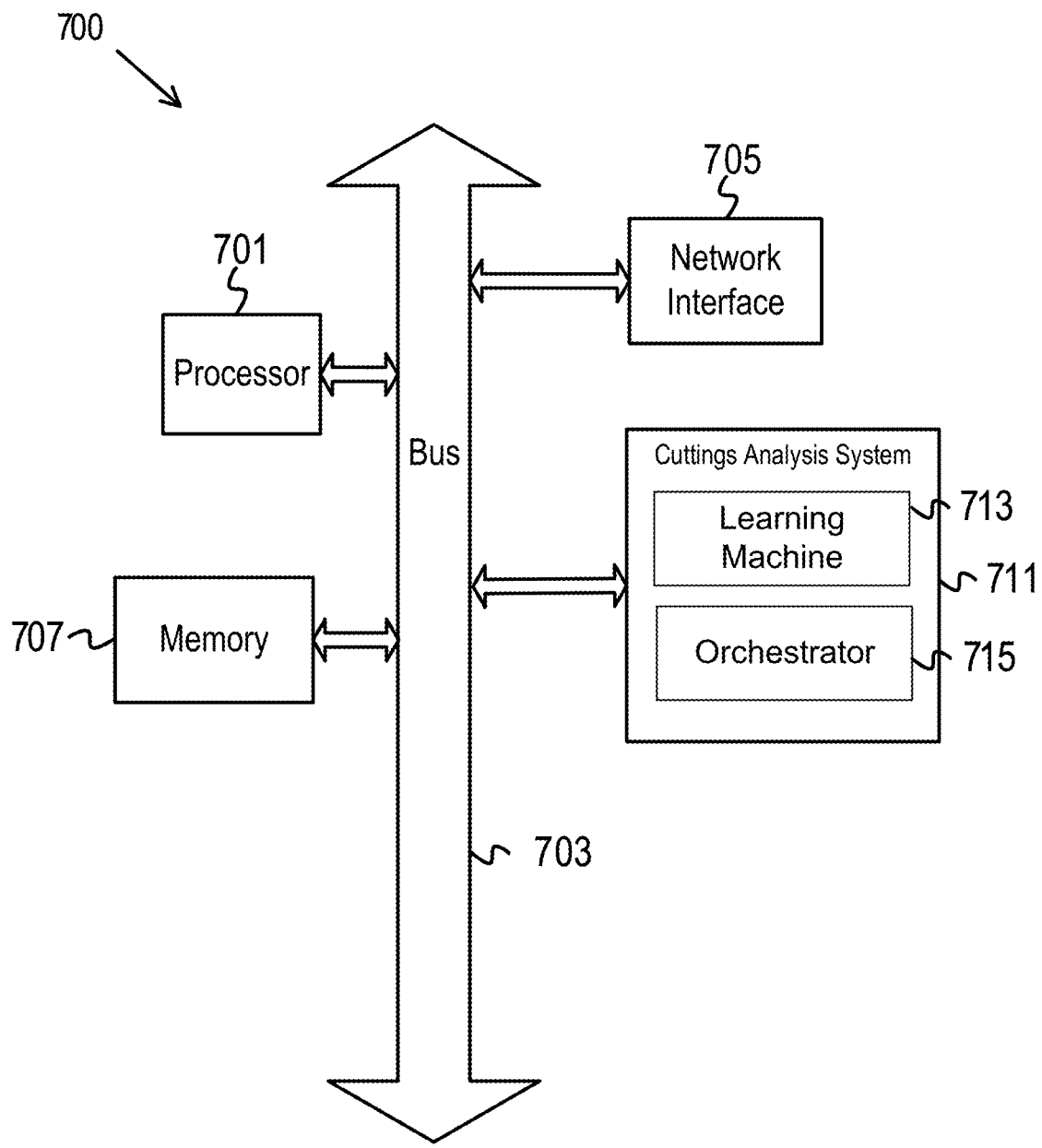
FIG. 7 depicts an example computer, according to some embodiments.

Embodiments of the exemplary cuttings analysis system may be used in conjunction with an example computer, as described in FIG. 7. A computer 700 system includes a processor 701 (possibly including multiple processors, multiple cores, multiple nodes, and/or implementing multithreading, etc.). The computer 700 includes a memory 707. The memory 707 may be system memory or any one or more of the above already described possible realizations of machine-readable media. The computer 700 also includes a bus 703 and a network interface 705. The computer 700 may communicate via transmissions to and/or from remote devices via the network interface 705 in accordance with a network protocol corresponding to the type of network interface, whether wired or wireless and depending upon the carrying medium. In addition, a communication or transmission may involve other layers of a communication protocol and or communication protocol suites (e.g., transmission control protocol, Internet Protocol, user datagram protocol, virtual private network protocols, etc.).

The computer 700 may also include a cuttings analysis system 711. The cuttings analysis system 711 may utilize a cloud computing environment allowing an operator to monitor cuttings from a remote location. This configuration may reduce latency and increase a speed at which detections and other deliverables may be processed to detect downhole problems. The cuttings analysis system 711 may also be physically located at the wellsite as an edge device.

The cuttings analysis system may further comprise a learning machine 713 and an orchestrator 715. The cuttings analysis system 711 may perform one or more of the operations described herein. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 may be coupled to the processor 701.

While the aspects of the disclosure are described with reference to various implementations and exploitations, it will be understood that these aspects are illustrative and that the scope of the claims is not limited to them. In general, techniques for cuttings analysis via a learning machine as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Example Operation of the Learning Machine

Figure 8:
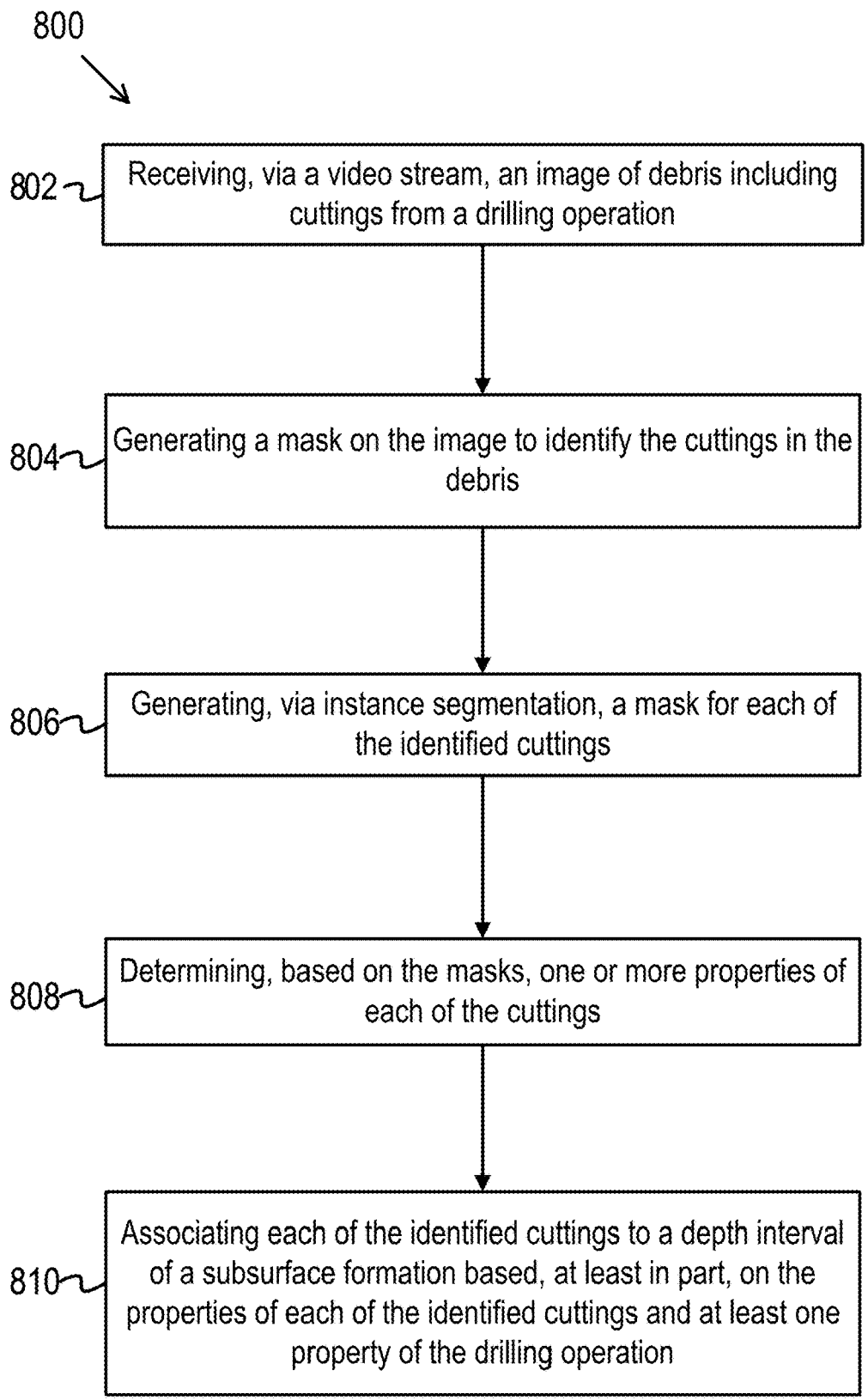
FIG. 8 depicts a method for cuttings analysis via the cuttings analysis system, according to some embodiments.

FIG. 8 describes a method 800 for cuttings analysis via the cuttings analysis system, according to some embodiments. The cuttings analysis system may additionally comprise the previously discussed orchestrator and the learning machine. The method 800 may bear resemblance to some of the operations described above. Operations of the method 800 begin at block 802.

At block 802, the method may receive an image of debris including cuttings from the drilling operation via a video stream. For example, the orchestrator 230 may receive a video stream 202, extract the image frame via the ExtractFrame module 204, and send the extracted frame for processing. Flow progresses to block 804.

At block 804, the method may generate a mask on the image to identify cuttings in the debris. For example, the frame processing node 215 may perform segmentation algorithms on the image to identify the cuttings. The ML Processing module 218 within the frame processing node 215 may be trained to create the mask based on training data generated in a process similar to that of blocks 301-307. Flow progresses to block 806.

At block 806, the method may generate, via instance segmentation, a mask for each of the identified cuttings. For example, the learning machine may perform operations similar to those described in block 510 of FIG. 5. Flow progresses to block 808.

At block 808, the method may determine, based on the masks, one or more properties of each of the cuttings. For example, the cuttings analysis system may perform operations similar to those described in block 512 of FIG. 5. Flow progresses to block 810.

At block 810, the method may associate each of the identified cuttings to a depth interval of a subsurface formation based, at least in part, on the properties of each of the identified cuttings and at least one property of the drilling operation. For example, the cuttings analysis system may perform operations similar to those described in block 514 of FIG. 5 and block 608 of FIG. 6. The cuttings analysis system may additionally output a trend line of cuttings volumes across multiple frames and diagnose a potential cause of drilling dysfunction or an abnormal drilling condition based on noticeable trends. The cuttings analysis system may output the potential cause of drilling dysfunction to a user interface, and the system may additionally associate any abnormal drilling condition or borehole dysfunction to a specific depth interval based on a quantified lag time of the cuttings. Flow of the method 800 may conclude after the operations of block 810.

Example Embodiments

Embodiment #1: A method for controlling a learning machine used in a drilling operation to drill a well into a subsurface formation, the method comprising: receiving, via a video stream, an image of debris including cuttings from the drilling operation; generating a first mask on the image to identify the cuttings in the debris; generating, via instance segmentation, a second mask for each of the identified cuttings; determining, based on the second masks, one or more properties of each of the cuttings; and associating each of the identified cuttings to a depth interval of the subsurface formation based, at least in part, on the properties of each of the identified cuttings and at least one property of the drilling operation.

Embodiment #2: The method of Embodiment 1 further comprising creating training data for the learning machine, wherein creating the training data includes: extracting a plurality of small patches from the image; selecting random patches of the small patches; creating a third mask for each of the random patches; verifying each of the third masks; and outputting a final mask after verification.

Embodiment #3: The method of any one of Embodiments 1-2, further comprising: quantifying a travel time of the cuttings based on the properties of the identified cuttings and the at least one property of the drilling operation; and associating each of the identified cuttings to the depth interval based on the travel time.

Embodiment #4: The method of any one of Embodiments 1-3, wherein the at least one property of the drilling operation comprises a flow rate of drilling mud from a drill bit, a depth of the drill bit, and an inclination angle of the well.

Embodiment #5: The method of any one of Embodiments 2-4, wherein verifying each of the third masks is completed manually by a subject matter expert.

Embodiment #6: The method of any one of Embodiments 1-5, wherein determining, based on the second masks, the one or more properties of each of the cuttings comprises determining an area, perimeter, aspect ratio, sphericity, circularity, Feret diameter, or approximate volume of each of the cuttings within the image.

Embodiment #7: The method of Embodiment 6, further comprising performing a volume trend analysis on the identified cuttings, the volume trend analysis comprising: estimating a total cuttings volume for each of a plurality of image frames based on the approximate volume of each of the cuttings within the image; generating a trend line of the total cuttings volumes for each of the plurality of image frames; and diagnosing an issue of the drilling operation or determining a formation property based on the trend line.

Embodiment #8: The method of any one of Embodiments 1-7, wherein associating each of the identified cuttings to the depth interval of the subsurface formation further comprises: diagnosing an issue of the drilling operation at the depth interval based on the properties of each of the identified cuttings; and outputting, from the learning machine, a recommended solution to the issue of the drilling operation to a user interface in real time.

Embodiment #9: A cutting analysis system including a learning machine and comprising program code configured to analyze cuttings during a drilling operation in which a well is drilled into a subsurface formation, the program code executable on one or more processors, the program code comprising: instructions to receive, via a video stream, an image of debris including cuttings from the drilling operation; instructions to generate a first mask on the image to identify the cuttings in the debris; instructions to generate, via instance segmentation, a second mask for each of the identified cuttings; instructions to determine, based on the second masks, one or more properties of each of the cuttings; and instructions to associate each of the identified cuttings to a depth interval of the subsurface formation based, at least in part, on the properties of each of the identified cuttings and at least one property of the drilling operation.

Embodiment #10: The cuttings analysis system of Embodiment 9 further comprising program code to train the learning machine, further comprising: instructions to extract a plurality of small patches from the image; instructions to select random patches of the small patches; instructions to create a third mask for each of the random patches; instructions to verify each of the third masks; and instructions to output a final mask after verification.

Embodiment #11: The cuttings analysis system of any one of Embodiments 9-10, further comprising: instructions to quantify a travel time of the cuttings based on the properties of the identified cuttings and the at least one property of the drilling operation; and instructions to associate each of the identified cuttings to the depth interval based on the travel time.

Embodiment #12: The cuttings analysis system of any one of Embodiments 9-11, wherein the program code to determine, based on the second masks, the one or more properties of each of the cuttings comprises instructions to determine an area, perimeter, aspect ratio, sphericity, circularity, Feret diameter, or approximate volume of each of the cuttings within the image.

Embodiment #13: The cuttings analysis system of Embodiment 12, further comprising program code to perform a volume trend analysis on the identified cuttings, the program code to perform the volume trend analysis including: instructions to estimate a total cuttings volume for each of a plurality of image frames based on the approximate volume of each of the cuttings within the image; instructions to generate a trend line of the total cuttings volumes for each of the plurality of image frames; and instructions to diagnose an issue of the drilling operation or determine a formation property based on the trend line.

Embodiment #14: The cuttings analysis system of any one of Embodiments 9-13, wherein the program code to associate each of the identified cuttings to a depth interval of the subsurface formation further including: instructions to diagnose an issue of the drilling operation at the depth interval based on the properties of each of the identified cuttings; and instructions to output, from the learning machine, a recommended solution to the issue of the drilling operation to a user interface in real time.

Embodiment #15: One or more non-transitory machine-readable media including a learning machine and comprising program code configured for cuttings analysis during a drilling operation in which a well is drilled into a subsurface formation, the program code executable on one or more processors, the program code comprising: instructions to receive, via a video stream, an image of debris including cuttings from the drilling operation; instructions to generate a first mask on the image to identify the cuttings in the debris; instructions to generate, via instance segmentation, a second mask for each of the identified cuttings; instructions to determine, based on the second masks, one or more properties of each of the cuttings; and instructions to associate each of the identified cuttings to a depth interval of the subsurface formation based, at least in part, on the properties of each of the identified cuttings and at least one property of the drilling operation.

Embodiment #16: The machine-readable media of Embodiment 15 further comprising program code to train the learning machine, comprising: instructions to extract a plurality of small patches from the image; instructions to select random patches of the small patches; instructions to create a third mask for each of the random patches; instructions to verify each of the third masks; and instructions to output a final mask after verification.

Embodiment #17: The machine-readable media of any one of Embodiments 15-16, further comprising: instructions to quantify a travel time of the cuttings based on the properties of the identified cuttings and the at least one property of the drilling operation; and instructions to associate each of the identified cuttings to the depth interval based on the travel time.

Embodiment #18: The machine-readable media of any one of Embodiments 15-17, wherein the program code to determine, based on the second masks, the one or more properties of each of the cuttings comprises instructions to determine an area, perimeter, aspect ratio, sphericity, circularity, Feret diameter, or approximate volume of each of the cuttings within the image.

Embodiment #19: The machine-readable media of Embodiment 18, further comprising program code to perform a volume trend analysis on the identified cuttings, comprising: instructions to estimate a total cuttings volume for each of a plurality of image frames based on the approximate volume of each of the cuttings within the image; instructions to generate a trend line of the total cuttings volumes for each of the plurality of image frames; and instructions to diagnose an issue of the drilling operation or determine a formation property based on the trend line.

Embodiment #20: The machine-readable media of any one of Embodiments 15-19, wherein the program code to associate each of the identified cuttings to a depth interval of the subsurface formation, comprising: instructions to diagnose an issue of the drilling operation at the depth interval based on the properties of each of the identified cuttings; and instructions to output, from the learning machine, a recommended solution to the issue of the drilling operation to a user interface in real time.

What is claimed is:

1. A method for controlling a learning machine used in a drilling operation to drill a well into a subsurface formation, the method comprising:
   receiving, via a video stream, a two-dimensional image of debris including cuttings from the drilling operation;
   generating a first mask on the image to identify the cuttings in the debris;
   generating, via instance segmentation, a second mask for each of the identified cuttings;
   determining, based on the second masks, an approximate volume of each of the cuttings within the image; and
   associating each of the identified cuttings to a depth interval of the subsurface formation based, at least in part, on the approximate volume of each of the identified cuttings and at least one property of the drilling operation.

2. The method of claim 1 further comprising creating training data for the learning machine, wherein creating the training data includes:
   extracting a plurality of small patches from a training image;
   selecting random patches of the small patches;
   creating a third mask for each of the random patches;
   verifying each of the third masks; and
   outputting a final mask after verification.

3. The method of claim 1, further comprising:
   quantifying a travel time of the cuttings based on one or more properties of the identified cuttings and the at least one property of the drilling operation; and
   associating each of the identified cuttings to the depth interval based on the travel time.

4. The method of claim 1, wherein the at least one property of the drilling operation comprises a flow rate of drilling mud from a drill bit, a depth of the drill bit, and an inclination angle of the well.

5. The method of claim 2, wherein verifying each of the third masks is completed manually by a subject matter expert.

6. The method of claim 1, further comprising:
   determining, based on the second masks, one or more properties of each of the cuttings, wherein determining the one or more properties comprises determining at least one of an area, perimeter, aspect ratio, sphericity, circularity, or Feret diameter of each of the cuttings within the image.

7. The method of claim 1, further comprising performing a volume trend analysis on the identified cuttings, the volume trend analysis comprising:
   estimating a total cuttings volume for each of a plurality of image frames based on the approximate volume of each of the cuttings within the image;
   generating a trend line of the total cuttings volumes for each of the plurality of image frames; and
   diagnosing an issue of the drilling operation or determining a formation property based on the trend line.

8. The method of claim 1, wherein associating each of the identified cuttings to the depth interval of the subsurface formation further comprises:
   diagnosing an issue of the drilling operation at the depth interval based on one or more properties of each of the identified cuttings; and
   outputting, from the learning machine, a recommended solution to the issue of the drilling operation to a user interface in real time.

9. A cutting analysis system configured to analyze cuttings during a drilling operation in which a well is drilled into a subsurface formation, cuttings analysis system comprising:
   one or more processors; and
   a learning machine having instructions executable by the one or more processors, the instructions comprising,
      instructions to receive, via a video stream, a two-dimensional image of debris including cuttings from the drilling operation,
      instructions to generate a first mask on the image to identify the cuttings in the debris,
      instructions to generate, via instance segmentation, a second mask for each of the identified cuttings, instructions to determine, based on the second masks, an approximate volume of each of the cuttings within the image, and instructions to associate each of the identified cuttings to a depth interval of the subsurface formation based, at least in part, on the approximate volume of each of the identified cuttings and at least one property of the drilling operation.

10. The cuttings analysis system of claim 9, further comprising instructions to train the learning machine, wherein the instructions to train the learning machine comprise:

instructions to extract a plurality of small patches from a training image;
instructions to select random patches of the small patches;
instructions to create a third mask for each of the random patches;
instructions to verify each of the third masks; and
instructions to output a final mask after verification.

11. The cuttings analysis system of claim 9, further comprising:

instructions to quantify a travel time of the cuttings based on one or more properties of the identified cuttings and the at least one property of the drilling operation; and
instructions to associate each of the identified cuttings to the depth interval based on the travel time.

12. The cuttings analysis system of claim 9, further comprising:

instructions to determine, based on the second masks, one or more properties of each of the cuttings, wherein the instructions to determine the one or more properties comprise instructions to determine at least one of an area, perimeter, aspect ratio, sphericity, circularity, or Feret diameter of each of the cuttings within the image.

13. The cuttings analysis system of claim 9, further comprising instructions to perform a volume trend analysis on the identified cuttings, wherein the instructions to perform the volume trend analysis include:

instructions to estimate a total cuttings volume for each of a plurality of image frames based on the approximate volume of each of the cuttings within the image;
instructions to generate a trend line of the total cuttings volumes for each of the plurality of image frames; and
instructions to diagnose an issue of the drilling operation or determine a formation property based on the trend line.

14. The cuttings analysis system of claim 9, wherein the instructions to associate each of the identified cuttings to the depth interval of the subsurface formation further include:

instructions to diagnose an issue of the drilling operation at the depth interval based on one or more properties of each of the identified cuttings; and
instructions to output, from the learning machine, a recommended solution to the issue of the drilling operation to a user interface in real time.

15. One or more non-transitory machine-readable media including a learning machine and comprising instructions configured for cuttings analysis during a drilling operation in which a well is drilled into a subsurface formation, the instructions executable on one or more processors, the instructions comprising:

instructions to receive, via a video stream, a two-dimensional image of debris including cuttings from the drilling operation;
instructions to generate a first mask on the image to identify the cuttings in the debris;
instructions to generate, via instance segmentation, a second mask for each of the identified cuttings;
instructions to determine, based on the second masks, an approximate volume of each of the cuttings within the image; and
instructions to associate each of the identified cuttings to a depth interval of the subsurface formation based, at least in part, on the approximate volume of each of the identified cuttings and at least one property of the drilling operation.

16. The machine-readable media of claim 15 further comprising instructions to train the learning machine, wherein the instructions to train the learning machine comprise:

instructions to extract a plurality of small patches from a training image;
instructions to select random patches of the small patches;
instructions to create a third mask for each of the random patches;
instructions to verify each of the third masks; and
instructions to output a final mask after verification.

17. The machine-readable media of claim 15, further comprising:

instructions to quantify a travel time of the cuttings based on one or more properties of the identified cuttings and the at least one property of the drilling operation; and
instructions to associate each of the identified cuttings to the depth interval based on the travel time.

18. The machine-readable media of claim 15, further comprising:

instructions to determine, based on the second masks, one or more properties of each of the cuttings, wherein the instructions to determine the one or more properties comprise instructions to determine at least one of an area, perimeter, aspect ratio, sphericity, circularity, or Feret diameter of each of the cuttings within the image.

19. The machine-readable media of claim 15, further comprising instructions to perform a volume trend analysis on the identified cuttings, wherein the instructions to perform the volume trend analysis on the identified cuttings comprise:

instructions to estimate a total cuttings volume for each of a plurality of image frames based on the approximate volume of each of the cuttings within the image;
instructions to generate a trend line of the total cuttings volumes for each of the plurality of image frames; and
instructions to diagnose an issue of the drilling operation or determine a formation property based on the trend line.

20. The machine-readable media of claim 15, wherein the instructions to associate each of the identified cuttings to the depth interval of the subsurface formation comprise:

instructions to diagnose an issue of the drilling operation at the depth interval based on one or more properties of each of the identified cuttings; and
instructions to output, from the learning machine, a recommended solution to the issue of the drilling operation to a user interface in real time.

* * * * *